(12) United States Patent
Matsuura et al.

(10) Patent No.: US 6,421,452 B1
(45) Date of Patent: Jul. 16, 2002

(54) IMAGE PROCESSING APPARATUS AND METHOD FOR DETECTING CHANGE IN IMAGE

(75) Inventors: Tomohiko Matsuura, Utsunomiya; Yoshihiro Ishida; Takashi Oya, both of Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/363,105

(22) Filed: Jul. 29, 1999

(51) Int. Cl.$^7$ ................................................ G06K 9/00
(52) U.S. Cl. ..................................................... 382/107
(58) Field of Search ................................ 382/100, 107, 382/312, 319; 396/3, 4, 63, 64, 65, 79, 80, 81, 82, 104, 153, 154, 169, 213, 235, 246, 247; 73/1.41, 1.42, 1.56; 352/39, 46, 48, 140, 141, 205, 206; 348/152, 155, 169

(56) References Cited

U.S. PATENT DOCUMENTS

| | | | | |
|---|---|---|---|---|
| 4,309,089 A | * | 1/1982 | Harvey ....................... 396/208 |
| 5,218,397 A | * | 6/1993 | Takagi ......................... 396/157 |
| 5,325,146 A | * | 6/1994 | Toji ............................. 396/81 |
| 5,732,148 A | * | 3/1998 | Yamada et al. ............. 382/107 |
| 5,920,657 A | * | 7/1999 | Bender et al. .............. 382/284 |
| 5,933,664 A | * | 8/1999 | Bacs, Jr. ...................... 396/324 |
| 6,115,553 A | * | 9/2000 | Iwamoto ..................... 396/104 |
| 6,130,705 A | * | 10/2000 | Lareau et al. ............... 348/144 |
| 6,157,406 A | * | 12/2000 | Iura et al. ................... 348/220 |
| 6,211,912 B1 | * | 4/2001 | Shahraray ................... 348/228 |
| 6,233,006 B1 | * | 5/2001 | Lee ............................. 348/143 |

* cited by examiner

Primary Examiner—Andrew W. Johns
Assistant Examiner—Shervin Nakhjavan
(74) Attorney, Agent, or Firm—Robin, Blecker & Daley

(57) ABSTRACT

An image processing apparatus or an image processing method is arranged to input image data obtained by an image pickup device and an image pickup parameter of the image pickup device used in obtaining the image data, to make a comparison between the image pickup parameter for a target image and the image pickup parameter for another image, and to decide whether or not the target image differs from the other image, according to a result of the comparison.

29 Claims, 9 Drawing Sheets

| MEASURING AREA No. | EXPOSURE INFORMATION | | | DISTANCE INFORMATION |
|---|---|---|---|---|
| | SHUTTER SPEED (s) | IRIS | GAIN (dB) | FOCUS (mm) |
| 1 | 1/250 | 8 | 11 | 2000 |
| 2 | 1/125 | 8 | 12 | 2170 |
| 3 | 1/250 | 5.6 | 12 | 2200 |
| 4 | 1/250 | 8 | 14 | 1950 |
| 5 | 1/125 | 8 | 10 | 2050 |
| 6 | 1/250 | 5.6 | 12 | 2140 |
| . | . | . | . | . |
| . | . | . | . | . |
| . | . | . | . | . |

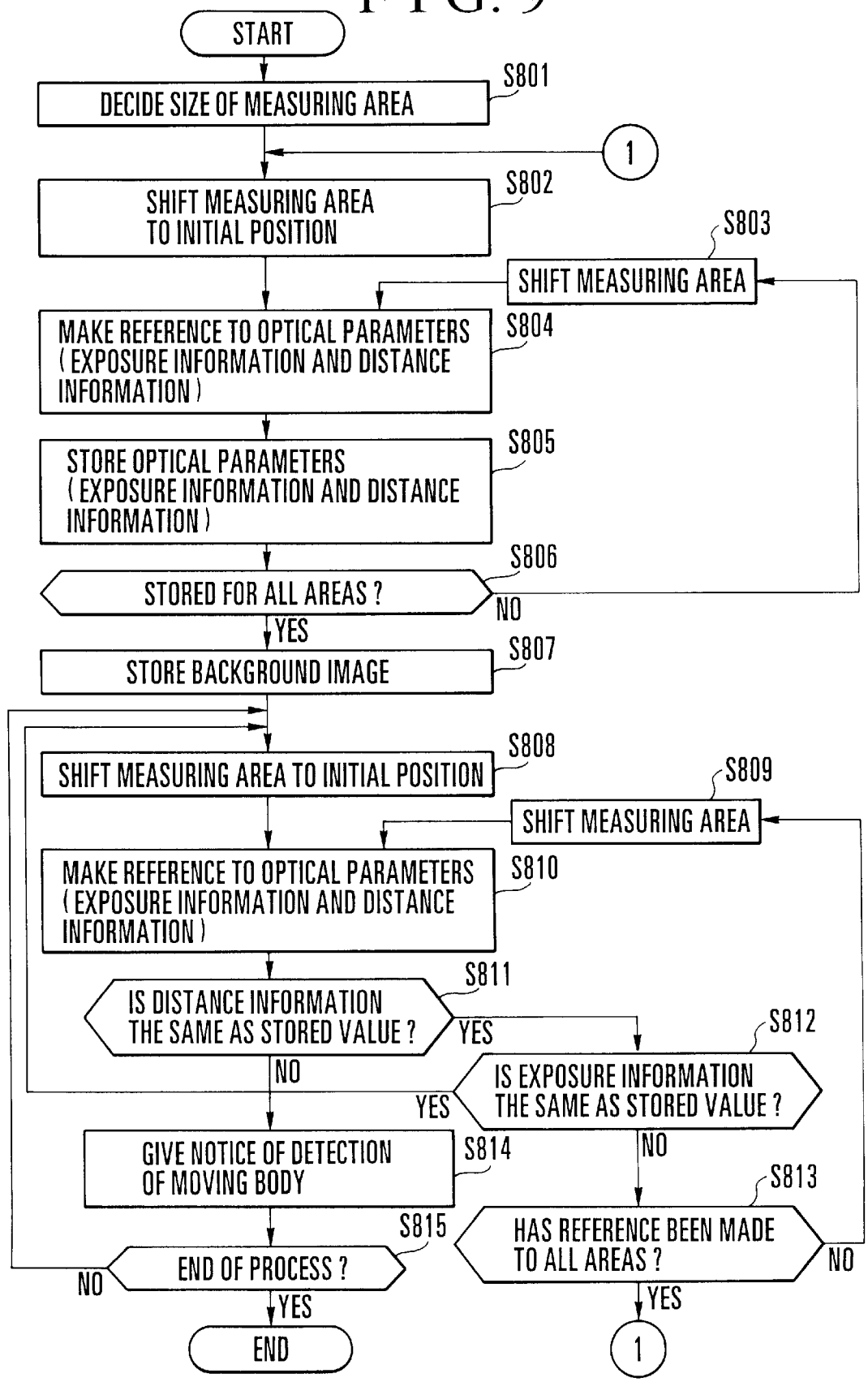

IMAGE PROCESSING APPARATUS AND METHOD FOR DETECTING CHANGE IN IMAGE

BACKGROUND OF THE INVENTION

1. Field of the Invention

The present invention relates to an image processing apparatus and an image processing method, and more particularly, to those for detecting and processing a change in image.

2. Description of Related Art

Heretofore, an image processing system for detecting the presence of a moving body on the basis of a change in image by an image processing method called a background difference technique has been developed and put into practical use.

In brief, according to the background difference technique, a difference between a background image prepared from an image previously picked up with a camera and image information newly picked up with the camera is detected as a moving body. In such detection of a moving body, it is general that, in order to cope with changes in lightness of a scene under surveillance or observation (an object of shooting), a background image is updated on the basis of the picked-up image information.

Responses obtainable by the background difference technique include a response caused by the presence of a moving body and a response caused by a change in lightness of a scene under surveillance or observation. In the case of the former response, giving a notice of the presence of the moving body is necessary. In the case of the latter response, the background image is required to be updated.

However, according to the prior art, it is necessary to make a discrimination between the two different responses solely on the basis of image information. The prior art method, therefore, necessitates a complex image processing operation. Besides, since it is difficult to accurately distinguish the two different responses from each other, the detection of a moving body is made leaving some ambiguity, which deteriorates the accuracy of detection.

BRIEF SUMMARY OF THE INVENTION

The invention is directed to the solution of the above-stated problem of the prior art. It is, therefore, an object of the invention to provide an image processing apparatus which is capable of more accurately detecting a moving body by clearly discriminating between a response caused by the presence of the moving body and a response caused by a change in lightness of a scene under surveillance or observation.

To attain the above object, in accordance with an aspect of the invention, an image processing apparatus or an image processing method is arranged to input image data obtained by image pickup means and an image pickup parameter of the image pickup means used in obtaining the image data, to make a comparison between the image pickup parameter for a target image and the image pickup parameter for another image, and to decide whether or not the target image differs from the other image, according to a result of the comparison.

Further, in accordance with another aspect of the invention, an image processing apparatus or an image processing method is arranged to measure an optical parameter, to generate image data while controlling an optical system according to a result of the measurement, to store the measured optical parameter in a storage medium, to make a comparison between the measured optical parameter and the optical parameter stored in the storage medium, and to decide any change in the image data according to a result of the comparison.

The above and other objects, features and advantages of the invention will become apparent from the following detailed description of preferred embodiments thereof taken in conjunction with the accompanying drawings.

BRIEF DESCRIPTION OF THE SEVERAL VIEWS OF THE DRAWING

FIG. 9 is a flow chart showing processes to be performed in the third embodiment of the invention.

DETAILED DESCRIPTION OF THE INVENTION

Hereinafter, preferred embodiments of the invention will be described in detail with reference to the drawings.

(First Embodiment)

Figure 1:
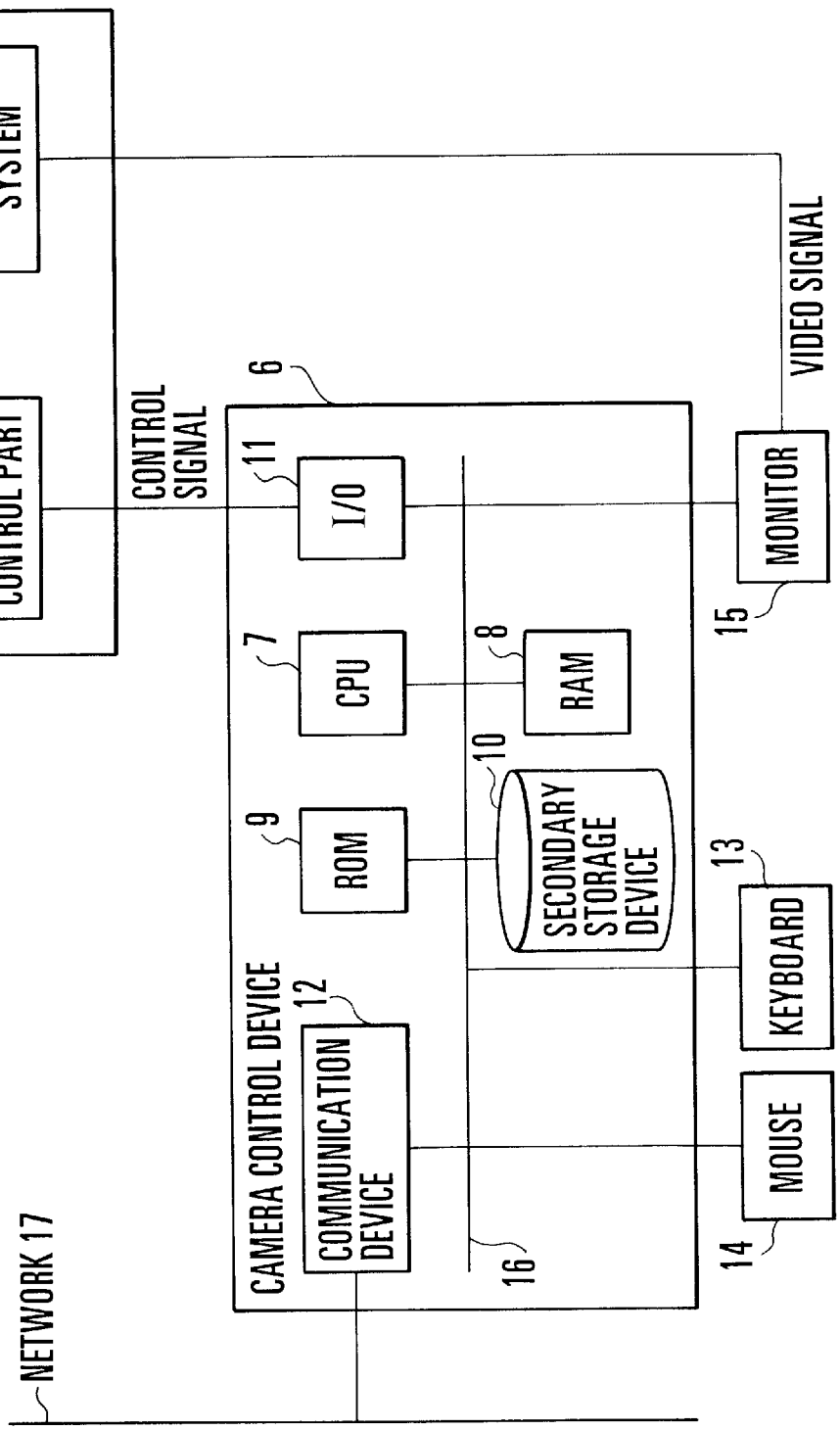
FIG. 1 is a block diagram showing the arrangement of a camera control system according to a first embodiment of the invention.

FIG. 1 is a block diagram showing the arrangement of a camera control system according to a first embodiment of the invention.

The camera control system is composed mainly of a camera 1 and a camera control device 6, which serves as an image processing apparatus according to the invention.

The camera 1 is composed of an image pickup system 2 arranged to pick up an image of an object and send a video signal to the camera control device 6, and an optical parameter control part 3 arranged to control optical parameters of the image pickup system 2. The optical parameters include a shutter speed, the aperture of an iris, a gain, white balance, etc.

The optical parameter control part 3 is connected to the camera control device 6 via a control signal line. The optical parameter control part 3 is thus arranged to enable the camera control device 6 to variously control the optical parameters in such a way as to set, obtain and optimize the optical parameters by communicating control signals to the optical parameter control part 3.

The control signal line is arranged according to RS-232C, parallel IO, or the like, but is not limited to any specific standards of communication.

The optical parameter control part 3 also has functions of performing automatic control over the optical parameters of a whole picked-up image by measuring the object of shooting. For example, the functions include a function of automatically obtaining an in-focus image, a function of automatically adjusting the lightness balance of a picture plane, etc. These functions can be easily carried out, for example, by using a camera module which is generally incorporated in a home video camera.

Whether the control over the optical parameters is to be performed by the camera control device 6 or by the above-stated automatic control function of the optical parameter control part 3 of the camera 1 can be decided by giving an instruction from the camera control device 6 through the control signal line.

The camera control device 6 has a CPU 7, a RAM 8, a ROM 9, a secondary storage device 10, an I/O 11 for communication with the camera 1, a communication device 12 which is arranged to permit giving control instructions from outside via a network 17, and a bus 16 arranged to interconnect these parts. To the bus 16 are connected a keyboard 13, a pointing device 14 such as a mouse, an image monitor 15, etc.

The camera control device 6 is realizable with a general-purpose computer system. With a control signal remotely sent from a remote place via the network 17, the camera control device 6 controls the optical parameter control part 3 through the control signal line in accordance with the control signal.

Figure 2A:
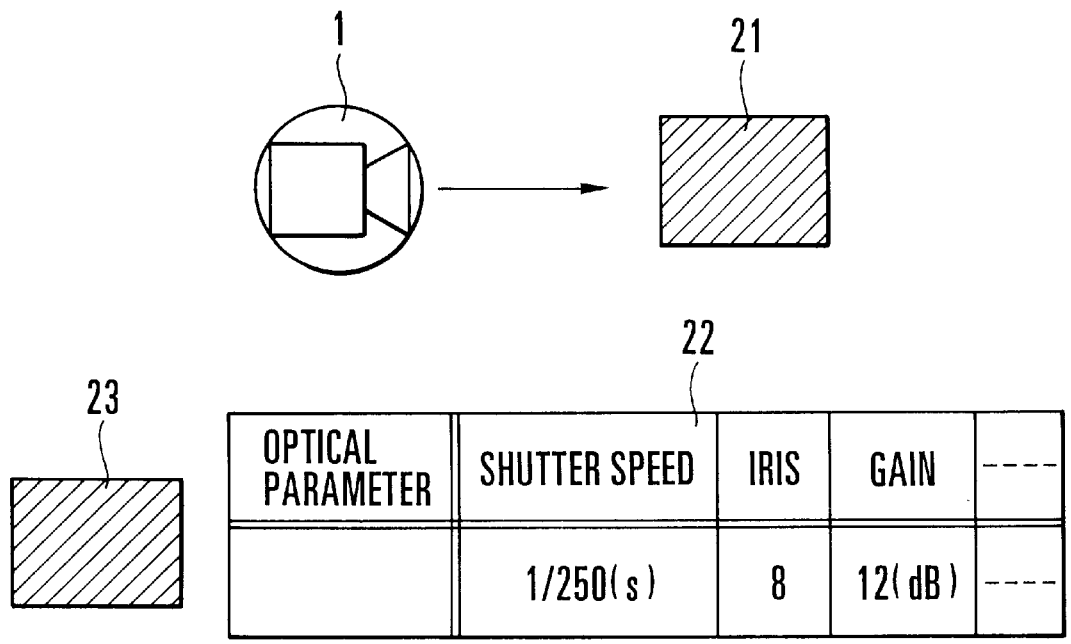
FIGS. 2(a) and 2(b) are diagrams for explaining the basic operating principle of the first embodiment of the invention.
Figure 2B:
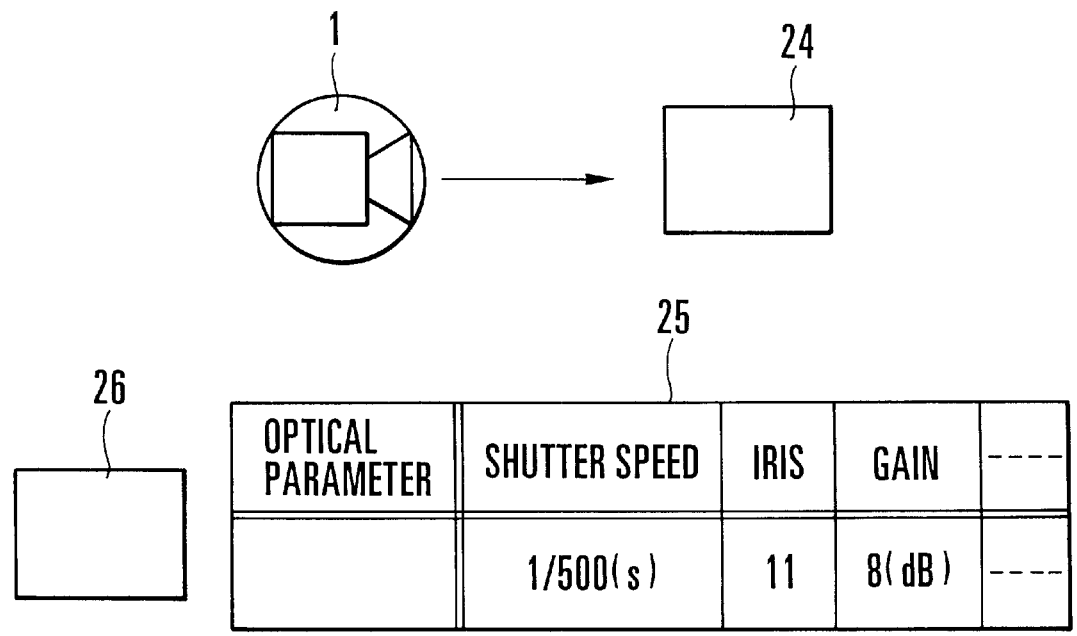

FIGS. 2(a) and 2(b) are diagrams for explaining the basic operating principle of the first embodiment of the invention. The following description of the operation is given on the assumption that the optical parameters include a shutter speed, an iris aperture and a gain.

FIG. 2(a) shows the manner in which optical parameters apposite to a certain scene are obtained by means of the optical parameter control part 3. In FIG. 2(a), reference numeral 21 denotes a scene aimed at by the camera 1. Optimum parameter values obtained by the optical parameter control part 3 and an image of the scene 21 picked up by the image pickup part 2 at the parameter values are stored in the RAM 8 of the camera control device 6.

Reference numeral 22 denotes the optimum optical parameters stored, and reference numeral 21 denotes a background image obtained by picking up an image of the scene 21 at the parameter values 22.

FIG. 2(b) shows a case where the lightness of the scene has changed. With the lightness of the scene 21 shown in FIG. 2(a) becoming brighter, the scene 21 changes into a scene 24, as shown in FIG. 2(b). Reference numeral 25 denotes optimum parameter values newly set for the scene 24, and reference numeral 26 denotes a current background image obtained by newly picking up an image of the scene 24 at the parameter values 25.

The CPU 7 compares the optical parameters 25 shown in FIG. 2(b) with the optical parameters 22 shown in FIG. 2(a) stored in the RAM 8. Since the optical parameters 25 differ from the optical parameters 22 in this instance, the CPU 7 judges that a change in lightness has occurred in the scenes. Then, the CPU 7 updates the optical parameters 22 stored in the RAM 8 into the optical parameters 25 and, at the same time, also updates the background image 23 into the background image 26.

If the optical parameters as stored are found to be the same as the optical parameters as newly set, the above-mentioned updating action on the RAM 8 is not performed.

The CPU 7 is arranged to detect any moving body always on the basis of the currently stored background image. More specifically, the CPU 7 detects any moving body on the basis of an image difference between a stored background image and a newly picked-up background image.

Further, in a case where a moving body has been detected by the CPU 7, a picked-up image of the moving body is sent out through the communication device 12 to an external terminal device (not shown) to notify the external terminal device of detection of the moving body. Incidentally, in communicating the image information, the communication device 12 performs some encoding process on the image information in conformity to applicable international standards such as JPEG, MPEG, or the like.

In addition, a program for effecting the above-stated processes of the CPU 7 is stored either in the ROM 9 or in the secondary storage device 10.

With the first embodiment arranged as described above, values of optical parameters most apposite at a certain point of time are stored, and the thus-stored values of optical parameters are compared with values of optical parameters currently obtained. The arrangement enables the first embodiment to appositely update a background image by accurately detecting a change in lightness of a scene, so that the accuracy in detecting a moving body can be enhanced without carrying out any complex image processing operation.

Figure 3:
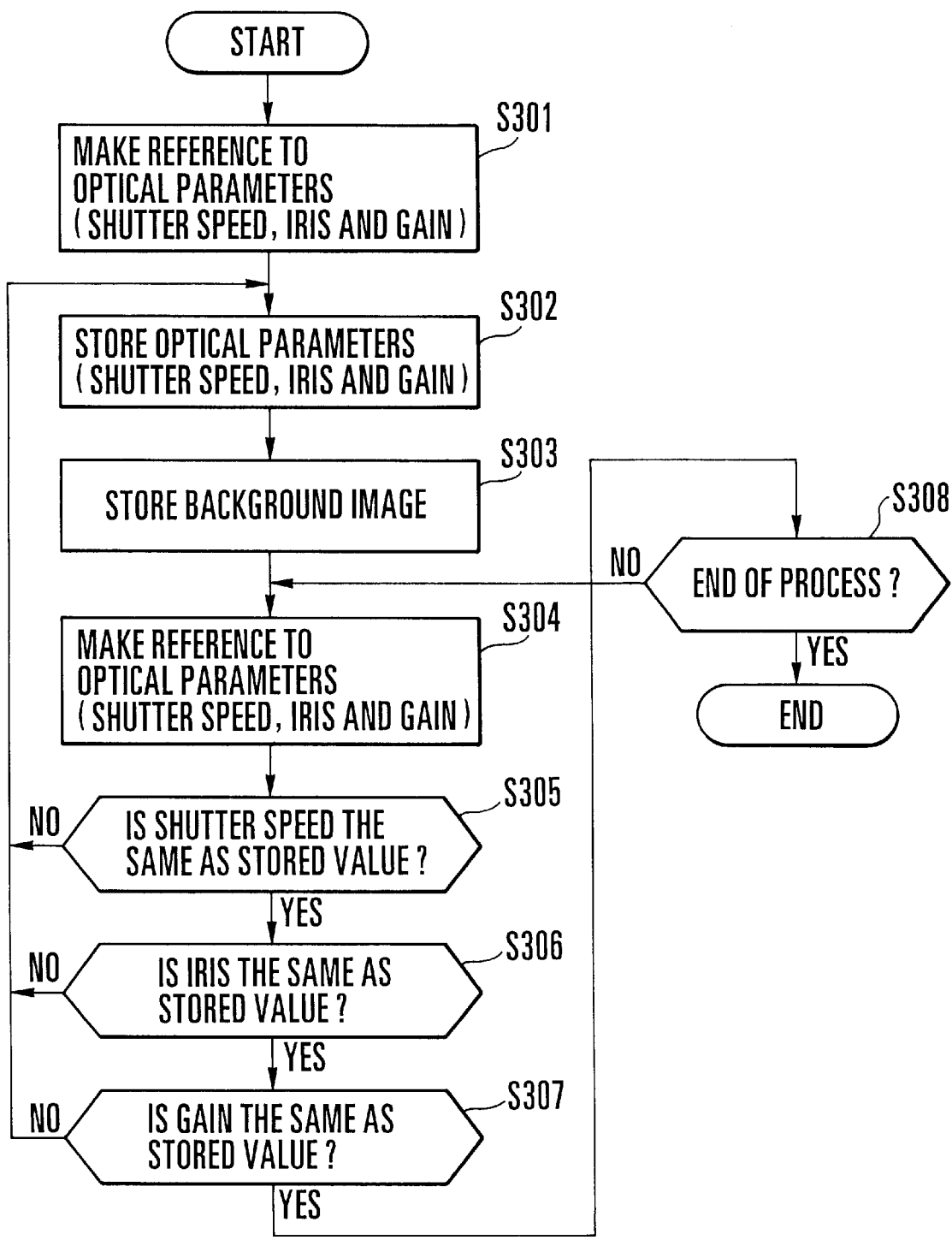
FIG. 3 is a flow chart showing processes to be performed in the first embodiment of the invention.

FIG. 3 is a flow chart showing the above-stated processes to be executed for updating a background image.

Referring to FIG. 3, after the start of a program, at a step S301, optical parameters most apposite to a current scene which are obtained by the automatic control function of the optical parameter control part 3 are read out by the CPU 7 so as to pick up an initial background image. At a step S302, the CPU 7 stores the optimum optical parameters in the RAM 8. At a step S303, a scene image is picked up with the optimum optical parameters used, and the scene image thus obtained is stored in the RAM 8 as an initial background image.

At the next step S304, the CPU 7 again reads optimum optical parameters obtained by the optical parameter control part 3. At steps S305, S306 and S307, the optimum optical parameters thus newly read are compared with the stored optimum optical parameters, respectively. If the value of any one of the optimum optical parameters is found to differ from that of the corresponding parameter of the stored optical parameters, the scene aimed at is decided to have changed in lightness. Then, the flow returns to the step S302, at which the current optical parameters are stored, and, at the step S303, an image of the current scene is picked up and the picked-up image is stored as a new background image. If the values of all the optical parameters are found at the steps S305 to S307 to be unchanged, the flow of operation proceeds to a step S308 without updating the background image. At the step S308, the steps S304 to S307 are repeated until an instruction is given from the user to bring the flow of operation to an end.

In the case of the flow of operation described above, the current and previous values of each of the optical parameters including the shutter speed, the iris aperture and the gain are compared with each other. In a case where, for example, only the value of gain is variable while the shutter speed and the iris aperture are at fixed values, however, the steps S305 and S306 are omitted.

Further, the values of the current optical parameters are compared with corresponding values of the stored optical parameters, respectively, at the steps S305, S306 and S307, to find if the current values are the same as the stored values. However, this arrangement may be changed to update the optical parameters only when the absolute value of a difference between any of the current values and a corresponding stored value is found to be an amount equal to or greater than a predetermined amount.

Further, the background image also may be decided to be updated or not updated on the basis of a combination of changing amounts of the plurality of optical parameters, according to the following formula, with a value $\Delta E$ (exposure value) resulting from the difference in absolute value of the shutter speed assumed to be $\Delta S$, the difference in absolute value of the iris aperture assumed to be $\Delta I$ and the difference in absolute value of the gain assumed to be $\Delta G$ and with coefficients $\alpha_S$, $\alpha_I$ and $\alpha_G$ appropriately predetermined:

$$\alpha E = \alpha_S \Delta S + \alpha_I \Delta I + \alpha_G \Delta G.$$

(Second Embodiment)

A camera control system according to a second embodiment of the invention is arranged to set a plurality of areas in an image, to compare the current optical parameters respectively with the stored optical parameters in each of the plurality of areas, and to update a background image when the values of the current optical parameters are found to differ from the values of the stored optical parameters in all the areas.

Figure 4:
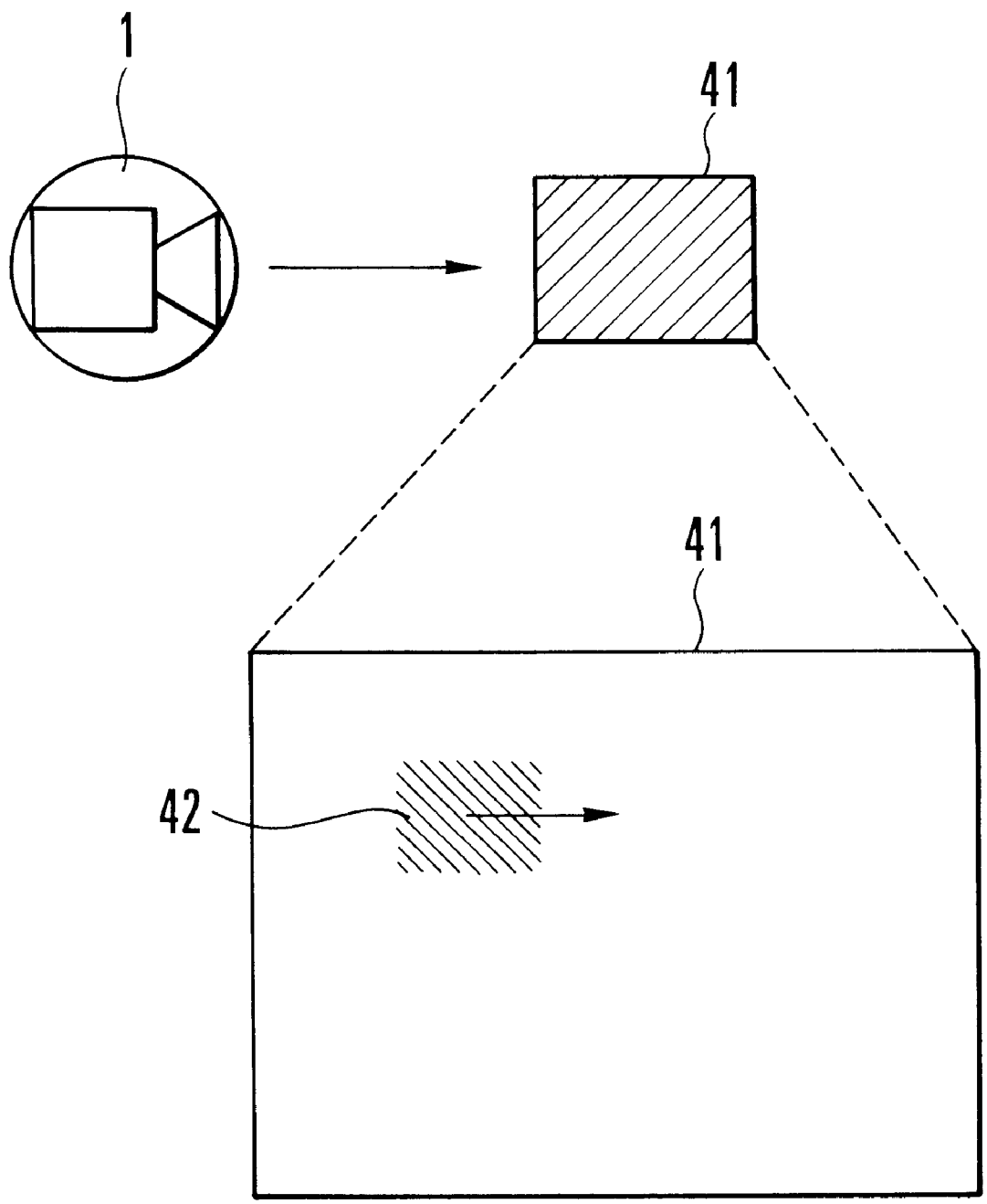
FIG. 4 is a diagram for explaining the basic operating principle of a second embodiment of the invention.

FIG. 4 shows the basic operating principle of the second embodiment.

Referring to FIG. 4, a measuring area 42 is set within a scene 41 whose image is being picked up by a camera 1. The measuring area 42 is shifted to a plurality of different area positions. The current optical parameters are compared respectively with the stored optical parameters in each of the measuring area positions. Then, the background image is updated when the values of the current optical parameters are found to differ from the values of the stored optical parameters in all of the measuring area positions.

The arrangement of the second embodiment permits detection of a temporary change of a small area of the scene being aimed at and a temporary change of optical parameters caused by the presence of a moving body. The background image, therefore, can be prevented from being updated at an inopportune timing, so that a moving body can be more accurately detected.

Figure 5:
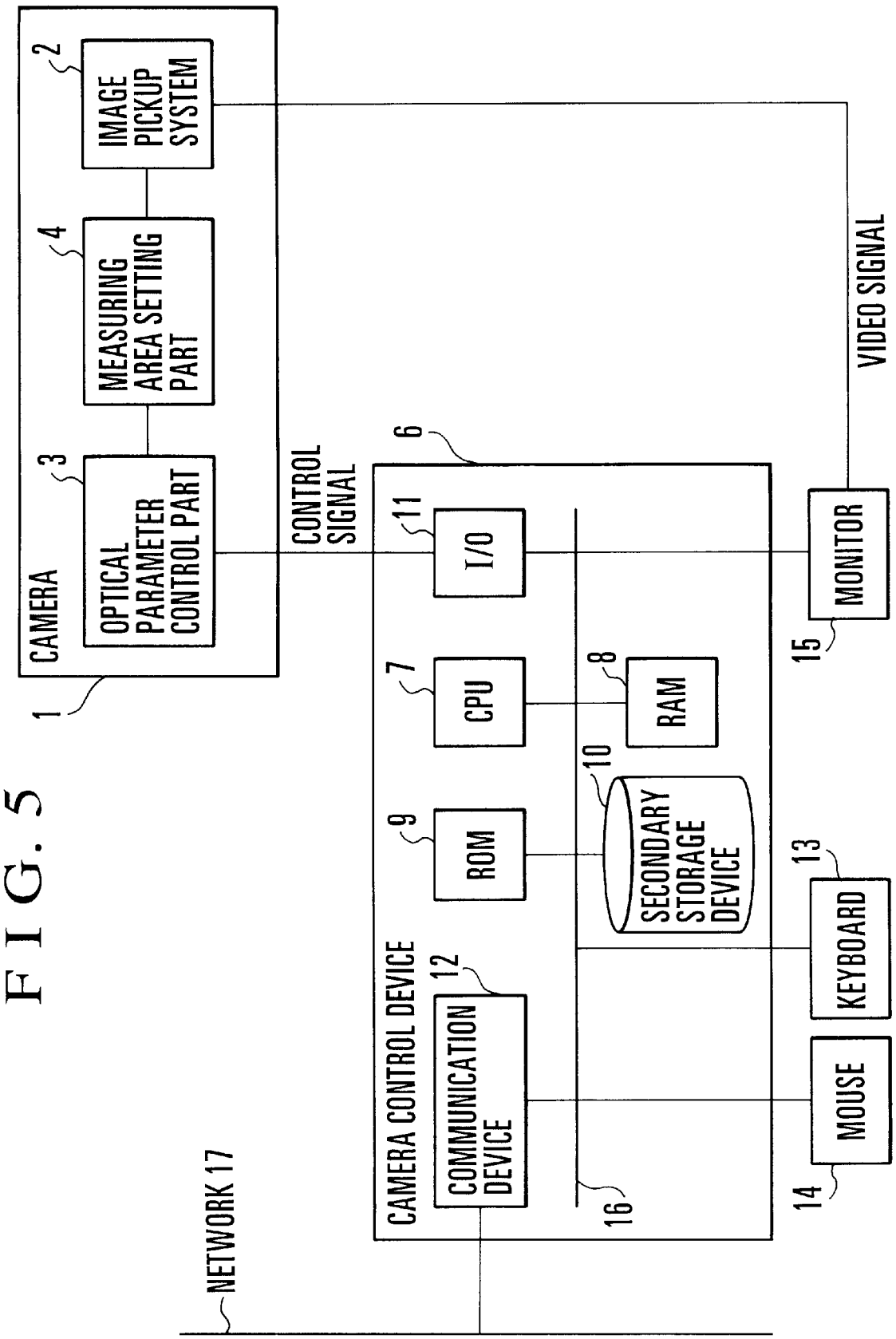
FIG. 5 is a block diagram showing the arrangement of a camera control system according to the second embodiment of the invention.

FIG. 5 shows the arrangement of the camera control system according to the second embodiment. The arrangement of the camera control system is the same as that of the first embodiment shown in FIG. 1 except that a measuring area setting part 4 is added to the camera shown in FIG. 1. The measuring area setting part 4 is arranged to permit setting the size, the number of positions, the location, etc., of the measuring area 42 shown in FIG. 4.

Figure 6:
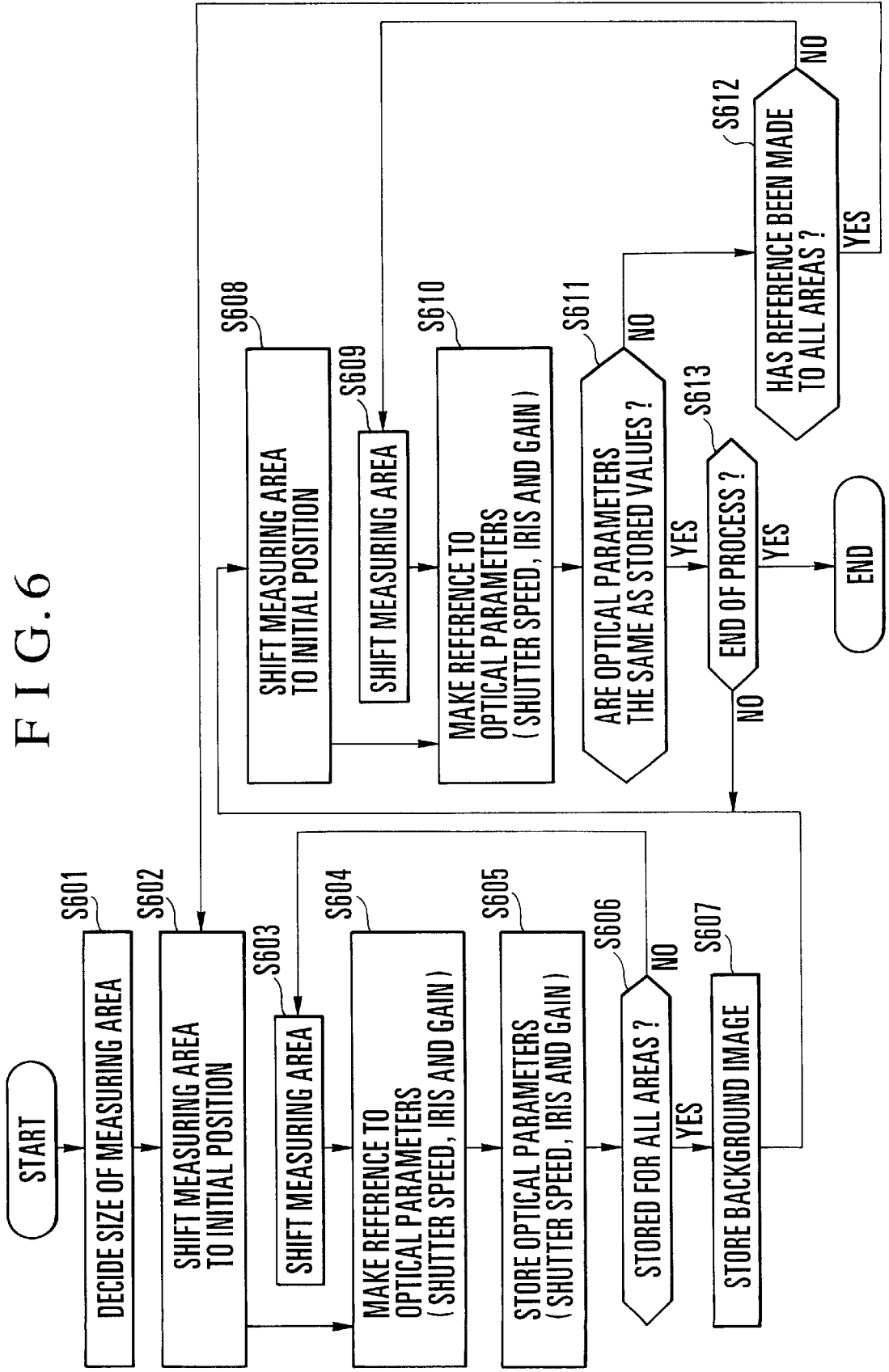
FIG. 6 is a flow chart showing processes to be performed in the second embodiment of the invention.

FIG. 6 is a flow chart showing processes to be performed in the second embodiment.

At a step S601, the size, the number of positions, etc., of the measuring area are set. At a step S602, the measuring area thus set is shifted to its initial position. At steps S603 to S607, optimum optical parameters apposite to the respective measuring area positions are set while shifting the measuring area from one position to another, and an image of the scene is picked up and stored as a background image. Subsequently, at steps S608 to S612, the measuring area is shifted again to the initial position, and, while shifting the measuring area in the same manner as mentioned above, the current optical parameters are obtained and compared respectively with the corresponding stored optical parameters in each of the measuring area positions. At the steps S602 to S607, only when the current optical parameters are found to differ from the corresponding stored optical parameters in all of the measuring area positions, the stored optical parameters and the stored background image are updated with the current optical parameters and the current background image.

The above processing operations are repeatedly performed until an instruction for the end of process is given at a step S613.

As mentioned above, the optical parameters are updated only when they are found to have changed in all the measuring area positions. This arrangement may be changed to carry out the updating action when the optical parameters are found to have changed in a majority (80% or more, for example) of the measuring area positions on the assumption that the lightness of the scene has changed.

In the above description of the first and second embodiments, a shutter speed, an iris aperture and a gain are used as the optical parameters. However, in addition to these parameters, a white balance value of course may be used as another parameter.

(Third Embodiment)

A third embodiment of the invention is a camera control system arranged to optimize optical (image pickup) parameters and also to use an image pickup system which is capable of making external reference and permits external control. For the processes of optimizing the optical parameters, making external reference and performing external control, the image pickup system has the functions of setting an area (called a measuring area) on an image to be used for these processes and also displaying the set area.

By using such an image pickup system, a background image is picked up and, at the same time, optimum optical parameters are stored for each of the measuring areas. After that, when the optical parameters are changed, for example, by a change of an illumination condition or the like, the background image and the optical parameters are automatically updated by computing differences of the current optical parameters from the optical parameters stored for each of the measuring areas.

Conceivable optical parameters include a shutter speed, an iris aperture, a gain (amplification factor of a video signal), white balance, focusing, zooming, etc. In the case of the third embodiment, however, four of these optical parameters including, by way of example, a shutter speed, an iris aperture, a gain and focusing are used as the optical parameters.

The term "focusing" as used herein means information on a distance to an object of shooting which is obtained from an in-focus position of a focusing lens. Further, in the following description, the four optical parameters to be used in the third embodiment are roughly divided into two groups of information. Thus, the shutter speed, the iris aperture and the gain are expressed as exposure information, and the focusing is expressed as distance information.

The hardware arrangement, operating principle and procedures for carrying out processes of the third embodiment are described as follows.

Figure 7:
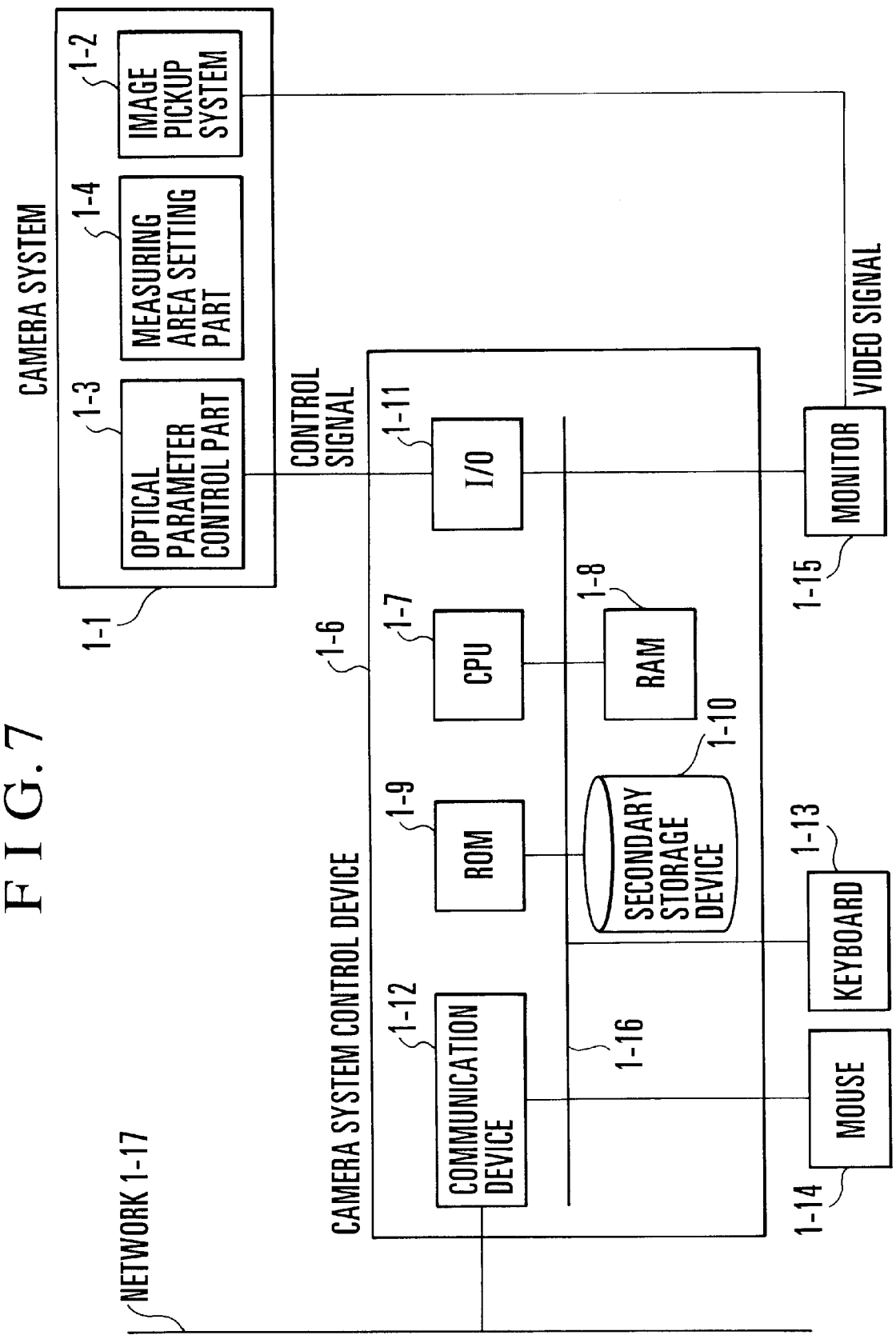
FIG. 7 is a block diagram showing the arrangement of a camera control system according to a third embodiment of the invention.

FIG. 7 is a block diagram showing the arrangement of the camera control system according to the third embodiment.

The camera control system is composed of a camera system 1-1 and a camera system control device 1-6.

As shown in FIG. 7, the camera system 1-1 includes an image pickup system 1-2 arranged to input an image, an optical parameter control part 1-3 arranged to control the optical parameters of the camera system 1-1, and a measuring area setting part 1-4 arranged to set an area for which the optical parameters are to be controlled by the optical parameter control part 1-3.

The optical parameter control part 1-3 is connected to the camera system control device 1-6 through a control signal line. The camera system control device 1-6 is thus arranged to be capable of performing control over setting, acquiring and optimizing the optical parameters by communicating control signals to the optical parameter control part 1-3 of the camera system 1-1.

The control signal line is arranged according to RS-232C, parallel IO, or the like but is not limited to any specific standards of communication. The video signal output format of the image pickup system 1-2 is arranged either to be in conformity to the NTSC system or to be of a YC separation method. The video image obtained by the image pickup system 1-2 is sent directly to an external video monitor 1-15.

The optical parameter control part 1-3 also has functions of performing automatic control over the optical parameters according to conditions of a shooting scene. For example, the functions include automatic adjustment of lightness balance, automatic focusing of an image, etc. It is also possible to obtain a distance to the object of shooting from the in-focus position of the focusing lens. These functions can be easily carried out, for example, by using a camera module which is generally incorporated in a home video camera.

Whether the control over the optical parameters is to be performed by the camera system control device 1-6 or by the above-stated automatic control functions of the optical parameter control part 1-3 of the camera system 1-1 can be decided by giving an instruction from the camera system control device 1-6 through the control signal line.

The measuring area setting part 1-4 is arranged to be controllable through a control signal from the camera system control device 1-6 in such a way as to set the size and position of the measuring area for which the optical parameters are to be controlled by the optical parameter control part 1-3.

The camera control device 1-6 includes a CPU 1-7, a RAM 1-8, a ROM 1-9, a secondary storage device 1-10, an I/O 1-11 for communication with the camera system 1-1, and a communication device 1-12 which permits giving a control instruction from outside via a network 1-17.

The CPU 1-7, the RAM 1-8, the ROM 1-9, the secondary storage device 1-10, the I/O 1-11 and the communication device 1-12 are interconnected by a bus 1-16. To the bus 16 are also connected a keyboard 1-13, a pointing device 1-14 such as a mouse, and the video monitor 1-15.

The camera system control device 1-6 controls the optical parameter control part 1-3 through the control signal line in accordance with a control signal input from the keyboard 1-13 or the mouse 1-14 or in accordance with a control signal remotely sent through the network 1-17.

Figure 8A:
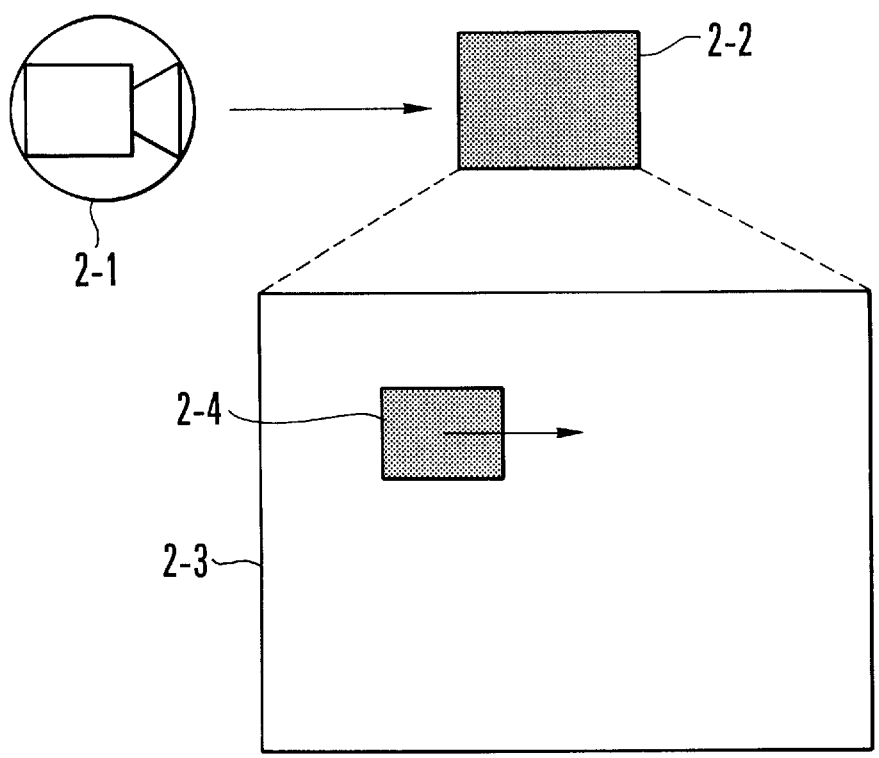
FIGS. 8(a) and 8(b) are diagrams for explaining the basic operating principle of the third embodiment of the invention.
Figure 8B:
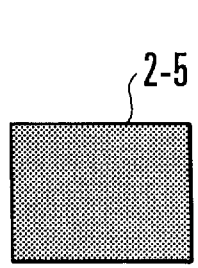

FIGS. 8(*a*) and 8(*b*) are diagrams for explaining the basic operating principle of the third embodiment of the invention.

FIG. 8(*a*) shows how the camera system 1-1 picks up the image of a certain scene and how optical parameters apposite to the scene are obtained in each of the measuring areas by means of the optical parameter control part 1-3 and the measuring area setting part 1-4.

In FIG. 8(*a*), reference numeral 2-1 denotes the camera system 1-1 shown in FIG. 7. Reference numeral 2-2 denotes a scene aimed at by the camera system 1-1. Reference numeral 2-3 denotes an enlarged view of the scene 2-2 aimed at. Within the enlarged scene 2-3, a measuring area 2-4 is set by the measuring area setting part 1-4.

After the shutter speed, the iris aperture, the gain and the focusing are optimized, as mentioned above, to obtain optimum values for each of the measuring areas of the scene by the optical parameter control part 1-3, the size and position values of the measuring area are stored in addition to the optimum values in the RAM 1-8 which is provided in the camera system control device 1-6.

FIG. 8(*b*) shows by way of example the scene image obtained by picking up an image of the scene shown in FIG. 8(*a*) and the optical parameters stored in the RAM 1-8. As shown in FIG. 8(*b*), the optical parameters are stored for each of different measuring areas. Further, in FIG. 8(*b*), reference numeral 2-5 denotes the image of the scene 2-2 shown in FIG. 8(*a*) as stored in the RAM 1-8.

In the third embodiment, the background image and the optical parameters are updated in the following manner. The optical parameter control part 1-3 which is disposed in the camera system 1-1 obtains the optimum values of the optical parameters composed of the exposure information and the distance information for the scene being aimed at in each position of the measuring area set as shown in FIG. 8(*a*) by using the measuring area setting part 1-4.

After that, if the exposure information value differs from a stored value in all the measuring areas while the distance information value is the same as a stored value in all the measuring areas, the background image is considered to have changed in its lightness, and the background image and the optical parameters are updated.

On the other hand, if the distance information value in at least one of the measuring areas is found to differ from the corresponding stored value, or if the exposure information value in only a part of the measuring areas is found to have changed from the corresponding stored value, the scene aimed at is judged to have some moving body existing therein. In that event, a notice of detection of a moving body is given. These processes are carried out by the CPU 1-7 in accordance with a program which is disposed at some suitable parts, such as the ROM 1-9 or the secondary storage device 1-10.

As described above, the optimum values of the optical parameters decided to be most apposite at some preceding point of time are stored in the RAM 1-8. After that, the current optical parameter values are compared with the stored optical parameter values. This arrangement permits detection of changes in lightness of the background image and updating the background image as necessary.

The combined use of information of different kinds, such as the exposure information and the distance information, permits making an accurate discrimination between a timing for updating the background image and another timing for giving a notice of detection of the presence of a moving body.

The procedures for carrying out the processes of the third embodiment are next described below referring to the flow chart of FIG. 9.

At a step S801 of FIG. 9, after the start of a program, an initial setting process is executed to decide the size of the measuring area.

At steps S802 to S806, processes are executed to store the optical parameters. Since a plurality of measuring area positions are set in the case of the third embodiment, these processes are repeated until reference is made to the optimum values of the optical parameters and these values are stored for all of the measuring area positions, as described below.

At the step S802, the measuring area is shifted to its initial position. At steps S804 and S805, reference is made to the optimum values of the optical parameters such as a shutter speed, an iris aperture, a gain and focusing, and the optimum values of the optical parameters are stored in the RAM 1Q8.

At the next step S806, a check is made to find if the above-stated processes have been finished for all the measuring area positions. If so, the flow of operation proceeds to a step S807. If not, the flow proceeds to the step S803 to shift the measuring area as necessary and to again execute the processes of making reference and storing the optical parameter values at the steps S804 and S805.

At the step S807, the current scene of shooting is also stored in the RAM 1-8 as a background image.

Next, a decision is made, at steps S808 to S813, as to whether the background image is to be updated or not. Since a plurality of measuring area positions are set, the decision is made by comparing the current optical parameters with the stored optical parameters in all the measuring area positions, as described below.

At the step S808, the measuring area is shifted to the initial position. After that, the flow proceeds to the step S810 to make reference to the exposure information (a shutter speed, an iris aperture and a gain) and the distance information (focusing).

At the step S811, of these optical parameters referred to, the distance information is first examined. The distance information value referred to is compared with the corresponding distance information value stored in the RAM 1-8 for the same measuring area. If these values differ from each other, the flow proceeds from the step S811 to a step S814. At the step S814, a notice of detection of a moving body is given. In the case of the third embodiment, image information is sent out through the communication device 1-12 to an external terminal apparatus and the moving body detection notice is given to the external terminal apparatus. In this instance, the background image is not updated. In communicating the image information from the communication device 1-12, the image information is sent out after it is encoded in accordance with applicable international standards such as JPEG, MPEG, or the like.

On the other hand, if the distance information value is found at the step S811 to be equal to the stored value, the flow of operation proceeds to the step S812. At the step S812, the values of the exposure information on each of the measuring area positions are checked to find if the current values are equal to the corresponding stored values for the same measuring area, by making reference to the exposure information and comparing the current exposure information with the corresponding stored exposure information. Even if only one of the exposure information values is found to differ from the corresponding stored value, the flow proceeds to the next step S813 on the assumption that the background image might have to be updated. At the step S813, the same processes of making reference and comparison are executed for the next measuring area position by repeating the steps S808 to S812.

In a case where the exposure information values for all the measuring area positions are found to differ from the corresponding stored values while the distance information is found to be the same as the stored distance information for all the measuring area positions, the flow returns from the step S813 to the step S802 to update the background image.

In the above-stated sequence of processes, if the current exposure information is found to be the same as the corresponding stored information even for only one of the measuring area positions (at the step S812) while the current distance information is found to be the same as the stored distance information, the scene being aimed at is judged to be unchanged in lightness. In that case, the background image is not updated, and the flow returns from the step S812 to the step S808 to repeat the processes of deciding whether the background image has to be updated or not.

The third embodiment is arranged, as described above, to use three parameters including a shutter speed, an iris aperture and a gain as the exposure information to be processed at the steps S804, S805, S810 and S812. However, the invention is, in general, not limited to such exposure information. In accordance with the invention, some other parameter such as white balance may be used as the exposure information either singly or in combination with other parameters.

In a case where the camera system is provided with such an optical parameter control part that is arranged to have the shutter speed and the iris aperture at fixed values and to permit varying only the gain, the processes of the steps S804, S805, S810 and S812 may be carried out by using only the value of gain.

In comparing the optical parameter values with the stored values at the steps S811 and S812, the distance information is compared with the stored distance information before the exposure information values are compared with the stored exposure values. Generally, however, a flow of operation is not limited to this sequence. The processes can be accomplished in the same manner as described above by varying the sequence of these steps as desired.

While the steps S811 and S812 of the third embodiment described above are arranged to find if the current measured values are the same as the stored values, the invention is not limited to this arrangement. This arrangement may be changed to find if the absolute value of a difference between each current measured value and the corresponding stored value is equal to or greater than a predetermined value.

Further the decision of above-stated steps also may be made according to whether a value $\Delta E$ which is determined by the absolute value $\Delta S$ of a difference of the shutter speed from its stored value and the absolute value $\Delta I$ of a difference of the iris aperture from its stored value and the absolute value $\Delta G$ of a difference of the gain from its stored value is larger than a predetermined value $\Delta E_{TH}$, on the basis of a combination of changing amounts of exposure information values according to the following formula, with coefficients $\alpha_S$, $\alpha_I$ and $\alpha_G$ appropriately predetermined:

$$\Delta E = \alpha_S \Delta S + \alpha_I \Delta I + \alpha_G \Delta G.$$

The third embodiment is arranged, as described above, to detect changes of the optical parameters for a plurality of measuring area positions, and to update the background image when the exposure information values are found to have changed for all of the measuring areas while the distance information is found to remain unchanged for all of the measuring areas. However, the invention is not limited to that arrangement. That arrangement many be changed, for example, to update the background image by considering the background image to have changed, in a case where the exposure information is found to have changed while the distance information remains unchanged for a majority (80%, for example) of the measuring areas.

In a case where the system of the first, second or third embodiment composed of various function blocks as shown in FIGS. 1, 5 or 7 is to be arranged in the form of a computer system composed of the CPU 7 or 1-7, a memory, etc., the ROM 8 or 1-8 or the secondary storage device 10 or 1-10 serving as the memory is employed as a storage medium according to the invention. A program for executing the control procedures shown in the flow chart of FIGS. 3, 6 or 9 is stored in the storage medium.

The storage medium may be selected from among semiconductor memories such as a ROM, a RAM, etc., an optical disk, a magneto-optical disk, a magnetic card, a nonvolatile memory card, etc.

Therefore, functions equivalent to the functions of each embodiment disclosed above can be realized to attain the same advantageous effect and object of the invention by using the storage medium for a system or an apparatus other than the systems shown in FIGS. 1, 5 and 7 and by reading and carrying out, with the system or a computer, the program stored in the storage medium.

Further, in a case where the processes are to be carried out in part or in their entirety by an OS (operating system) or the like operating on a computer, or in a case where program codes read out from the storage medium are written into a memory included in an extended function board inserted in a computer or an extended function unit connected to a computer and, after that, the processes are to be carried out in part or in their entirety by the extended function board or the extended function unit on the basis of the instructions of the program codes, functions equivalent to those of each embodiment disclosed also can be likewise accomplished to attain the same advantageous effect and the object of the invention.

In other words, the foregoing description of embodiments has been given for illustrative purposes only and not to be construed as imposing any limitation in every respect.

The scope of the invention is, therefore, to be determined solely by the following claims and not limited by the text of the specification and alterations made within a scope equivalent to the scope of the claims fall within the true spirit and scope of the invention.

What is claimed is:

1. An image processing apparatus comprising:
   a) input means for inputting image data obtained by image pickup means and an image pickup parameter of said image pickup means used in obtaining the image data;
   b) comparison means for making a comparison between the image pickup parameter for a target image and the image pickup parameter for another image; and
   c) decision means for deciding whether or not said target image differs from said another image, according to an output of said comparison means.

2. An apparatus according to claim 1, wherein the image pickup parameter is exposure information.

3. An apparatus according to claim 2, wherein the exposure information is information related to one of a shutter speed, an iris aperture and a gain or information related to a combination of the shutter speed, the iris aperture and the gain.

4. An apparatus according to claim 1, wherein the image pickup parameter is focusing-distance information.

5. An apparatus according to claim 1, wherein said decision means decides whether or not a moving body exists in said target image.

6. An apparatus according to claim 4, wherein said decision means decides that a moving body exists in said target image, when said target image differs from said another image in the focusing-distance information.

7. An apparatus according to claim 1, further comprising output means for externally outputting the image data according to an output of said decision means.

8. An apparatus according to claim 7, wherein said output means outputs the image data after subjecting the image data to compression encoding.

9. An apparatus according to claim 8, wherein the compression encoding is an encoding process of JPEG system.

10. An apparatus according to claim 8, wherein the compression encoding is an encoding process of MPEG system.

11. An apparatus according to claim 1, wherein said input means includes said image pickup means.

12. An apparatus according to claim 1, further comprising parameter storing means for storing the image pickup parameter inputted by said input means.

13. An apparatus according to claim 12, wherein the image pickup parameter stored by said parameter storing means is updated according to a result of the decision made by said decision means.

14. An apparatus according to claim 1, further comprising image data storing means for storing the image data inputted by said input means.

15. An apparatus according to claim 14, wherein the image data stored by said image data storing means is updated according to a result of the decision made by said decision means.

16. An apparatus according to claim 15, further comprising detection means for detecting a moving body on the basis of the image data inputted by said input means and the image data stored by said image data storing means.

17. An apparatus according to claim 1, wherein said comparison means makes a comparison between the image pickup parameters in a desired area within an image plane.

18. An image processing apparatus comprising:
   a) measuring means for measuring an optical parameter;
   b) image pickup means for generating image data by controlling an optical system according to an output of said measuring means;
   c) parameter storing means for storing the optical parameter measured by said measuring means;
   d) comparison means for making a comparison between the optical parameter measured by said measuring means and the optical parameter stored by said parameter storing means; and
   e) decision means for deciding whether the image data has changed or not, according to a result of the comparison made by said comparison means.

19. An apparatus according to claim 18, wherein said measuring means includes setting means for setting a measuring area for which the optical parameter is to be measured.

20. An apparatus according to claim 18, wherein the optical parameter includes exposure information.

21. An apparatus according to claim 20, wherein the exposure information is information related to one of a shutter speed, an iris aperture and a gain or information related to a combination of the shutter speed, the iris aperture and the gain.

22. An apparatus according to claim 18, wherein the optical parameter includes focusing-distance information.

23. An apparatus according to claim 18, wherein, when the image data is decided by said decision means to have changed, the optical parameter stored by said parameter storing means is updated.

24. An apparatus according to claim 18, further comprising image data storing means for storing the image data.

25. An apparatus according to claim 24, wherein, when the image data is decided by said decision means to have changed, the image data stored by said image data storing means is updated.

26. An apparatus according to claim 25, further comprising detection means for detecting a moving body on the basis of the image data generated by said image pickup means and the image data stored by said image data storing means.

27. An apparatus according to claim 18, further comprising notifying means for, when the image data is decided by said decision means to have changed, externally giving a notice of a result of the decision.

28. An image processing method comprising the steps of:
   inputting image data obtained by image pickup means and an image pickup parameter of said image pickup means used in obtaining the image data;

making a comparison between the image pickup parameter for a target image and the image pickup parameter for another image; and deciding whether or not said target image differs from said another image, according to a result of the comparison.

29. An image processing method comprising the steps of:

measuring an optical parameter;

generating image data by controlling an optical system according to a result of the measurement;

storing the optical parameter measured by said measuring step in a storage medium;

making a comparison between the optical parameter measured by said measuring step and the optical parameter stored in said storage medium; and deciding whether the image data has changed or not, according to a result of the comparison.

* * * * *

UNITED STATES PATENT AND TRADEMARK OFFICE
CERTIFICATE OF CORRECTION

PATENT NO.    : 6,421,452 B1                                                Page 1 of 1
DATED         : July 16, 2002
INVENTOR(S)   : Tomohiko Matsuura et al.

It is certified that error appears in the above-identified patent and that said Letters Patent is hereby corrected as shown below:

<u>Column 8,</u>
Line 63, delete "RAM 1Q8" and insert -- RAM 108. --.

Signed and Sealed this

Fourteenth Day of October, 2003

JAMES E. ROGAN
*Director of the United States Patent and Trademark Office*